W. KALICKI.
PLOW CONSTRUCTION.
APPLICATION FILED SEPT. 29, 1919.
1,342,386.
Patented June 1, 1920
2 SHEETS—SHEET 1.
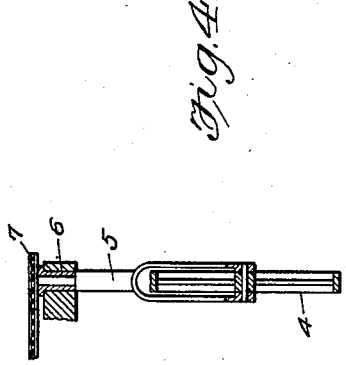
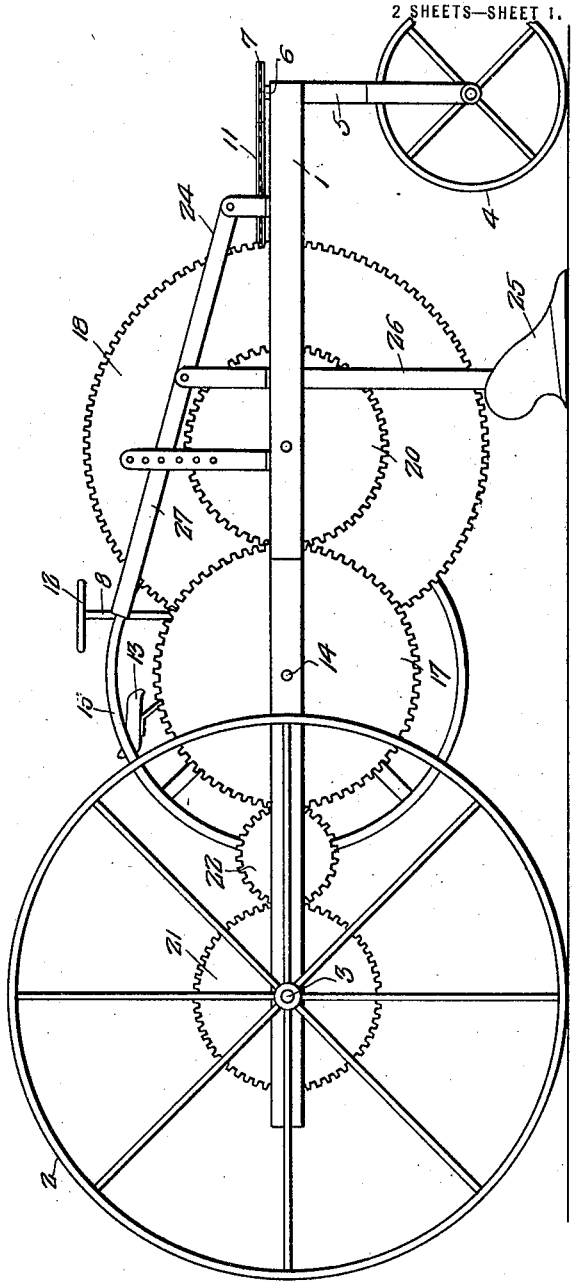
Inventor
Walenty Kalicki,
Witnesses
By Victor J. Evans
Attorney

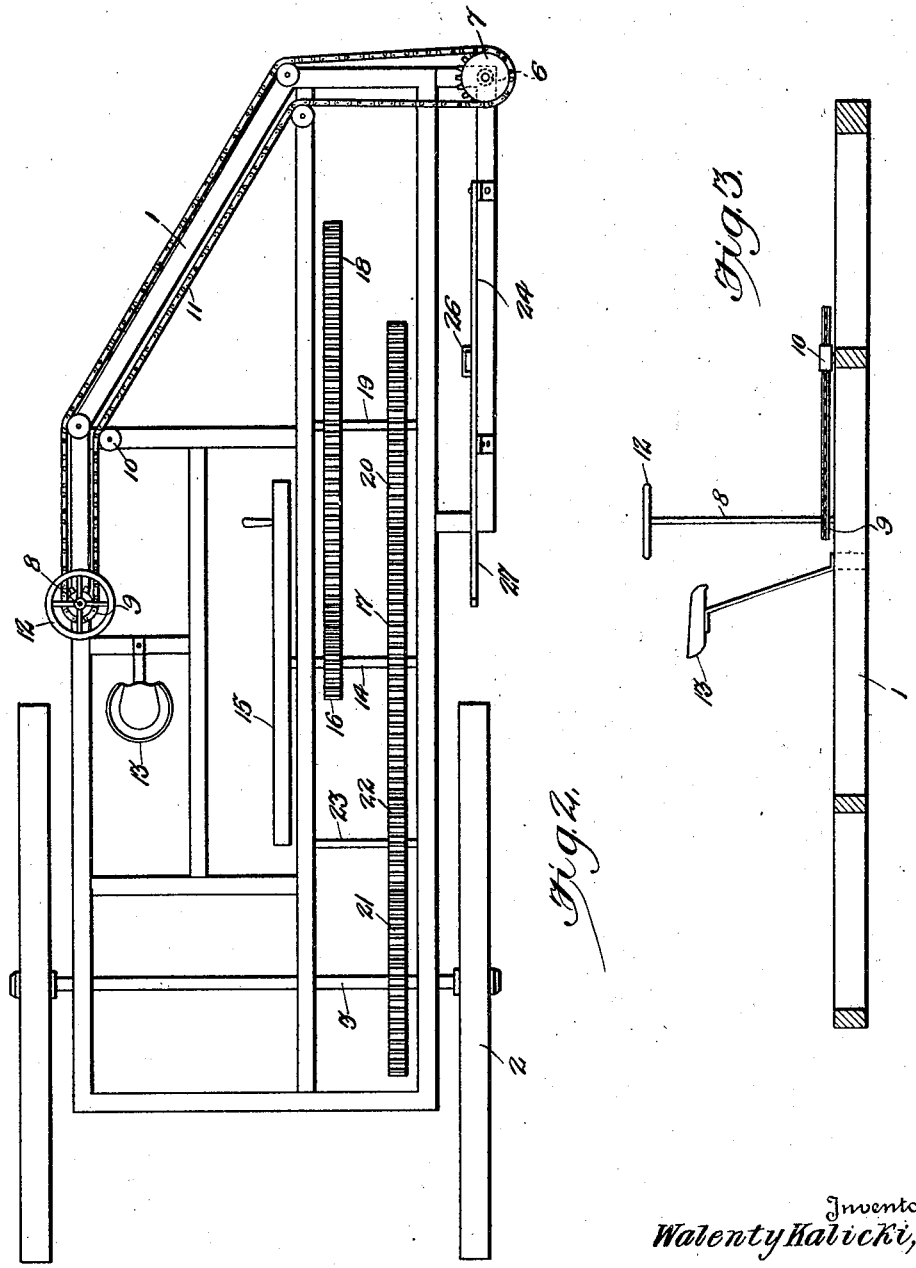

UNITED STATES PATENT OFFICE.

WALENTY KALICKI, OF GRAFTON, OHIO.

PLOW CONSTRUCTION.

1,342,386.  Specification of Letters Patent.  Patented June 1, 1920.

Application filed September 29, 1919. Serial No. 327,049.

*To all whom it may concern:*

Be it known that I, WALENTY KALICKI, a citizen of the United States, residing at Grafton, in the county of Lorain and State of Ohio, have invented new and useful Improvements in Plow Construction, of which the following is a specification.

This invention relates to plows of the mechanically propelled type, and has for its primary object the provision of a plow of substantial construction that may be accurately guided in its travel, while being hand propelled.

An object of the invention is to provide simple means for guiding the plow that may be conveniently operated by one hand of the operator leaving the other hand to operate my improved form of drive mechanism.

With these and other objects in view the invention will be better understood from the following detailed description taken in connection with the accompanying drawings, wherein;

Figure 1 is a side elevation of the plow constructed by my invention.

Fig. 2 is a top plan view.

Figs. 3 and 4 are detailed views.

Again referring to the drawing illustrating one manner in which my invention may be constructed the numeral 1 designates a frame, the rear portion of which is supported by a pair of traction wheels 2 mounted upon axle 3 while the front portion is supported and guided by a steering wheel 4. The steering wheel 4 is mounted for rotation within a post 5 that is in turn mounted for rotation in the bearings 6 that is connected with the frame. The upper end of the post 5 has connected thereto a sprocket wheel 7. Arranged approximately centrally of the frame is an upright shaft 8 to which is secured a sprocket wheel 9. Passing around the sprocket wheels 7 and 9 an daround guide wheels 10 is a chain 11, for rotating the post 5 and thereby directing the wheel 4 in its travel. For rotating the shaft 8 I provide a hand operated wheel 12. The hand wheel 12 is arranged to one side of the operator's seat 13 while upon the opposite side of the seat I mount a shaft 14 to which is secured a hand type of fly wheel 15. Shaft 14 has fixed thereto a gear 16 and further has loosely mounted thereon a second gear 17; the gear 16 meshes with a larger gear 18 that is fixed to a shaft 19. This shaft 19 has fixed thereto a second gear 20 meshing with the gear 17. A pair of larger gears 21 and 22 mounted respectively upon a shaft 23 and the axle 3 connects the gear 17 with the axle so that power applied to the hand wheel 15 will be transmitted to the traction wheel.

To complete my invention I provide an adjusting device 24 for the plow blade 25 which in one of its terms consists of a slide 26 operated by lever 27.

It is of course to be understood that the invention may be constructed in various other manners than shown, and therefore I do not desire to be limited in any manner except as set forth in the claim hereunto appended.

What I claim is:

In a plow structure including a wheeled frame and a dirigible wheel, means for steering the device comprising a sprocket secured upon the upper end of the journal of the dirigible wheel, a second sprocket secured upon the shaft of a hand wheel located at one side of the frame, both of said sprockets being in the same horizontal plane, guide rollers journaled upon one side of the frame and arranged in pairs, one pair being adjacent the dirigible wheel and the other pair adjacent the steering wheel, and a chain trained about said sprockets and engaging said rollers whereby upon rotation of the hand wheel said dirigible wheel will be correspondingly moved, the position of the hand wheel at one side of the frame leaving one hand of the operator free during turning of the hand wheel.

In testimony whereof I affix my signature.

WALENTY KALICKI.